(No Model.)
A. A. STIMSON.
CARRIAGE SPRING.
No. 303,680. Patented Aug. 19, 1884.
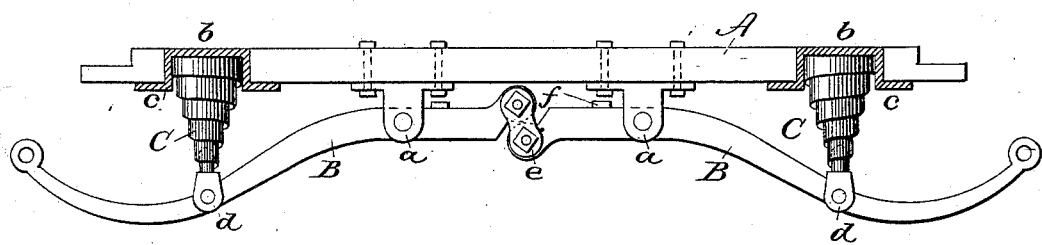
Witnesses:
C. L. Riker
J. C. Emery
Inventor:
A. A. Stimson
Per T. J. Leavitt
Attorney

United States Patent Office.

ASHBEL A. STIMSON, OF MONTPELIER, VERMONT.

CARRIAGE-SPRING.

SPECIFICATION forming part of Letters Patent No. 303,680, dated August 19, 1884.

Application filed February 2, 1884. (No model.)

*To all whom it may concern:*

Be it known that I, A. A. STIMSON, a citizen of the United States, residing at Montpelier, in the county of Washington and State of Vermont, have invented new and useful Improvements in Carriage-Springs, of which the following is a specification.

My invention relates to an improvement in springs for a side-bar or other vehicles; and it consists of an arrangement by which a conical volute spring made of a single ribbon of steel rolled in a cone form, with coils sufficiently apart to prevent their rubbing together, and all shutting within the outside coil when put to severe tension, and being held in position and in combination with levers, as hereinafter shown; also, the arrangement of the levers for the purpose of equalizing the action of the springs and preventing all side swaying of the carriage-body.

In the accompanying drawing, which is referred to and made a part of this specification, the figure is a side elevation of the spring, and shows the manner of its attachment to the wagon-bed.

A represents a bar attached to and running across the bottom of the carriage-body.

B B represent levers attached to bar A by standards $a\ a$, with their outer ends attached to the side bars of the carriage.

C C are volute springs with their upper ends resting in boxes or seats $b\ b$, which are embedded in bar A, resting on flanges $c\ c$. The lower ends of springs C C rest upon seats $d\ d$, jointed or attached to levers B B. The inner ends of levers B B are extended inward beyond standards $a\ a$, and are connected together at $e$, as shown, or in any other suitable manner, allowing a horizontal and vertical movement of the levers for the purpose of equalizing the action of the levers B B and springs C C, preventing any side motion of the carriage-body, also preventing the uplifting of the body, and thereby preventing the springs from being misplaced by dropping out of the boxes $b\ b$. In case the equalizing-connection is not desired, this uplifting of the body may be prevented by the use of stops $f\ f$, as shown.

Some of the advantages claimed for my invention are the volute spring, which has a greater strength, action, and durability than others of the same weight, and by the combination, as herein described, it prevents all tilting or side swaying of the carriage-body, that is so objectionable in case of most springs. It is equally well adapted to a heavy as a light load, and is inexpensive.

Having thus described my invention, what I claim, and wish to secure by Letters Patent, is—

1. The combination of bar A, levers B B, seats $d\ d$, springs C C, standards $a\ a$, and connection $e$, all arranged substantially as described, and for the purpose set forth.

2. The combination of levers B B, standards $a\ a$, springs C C, and seats $d\ d$, substantially as and for the purposes described.

3. The levers B B, extending beyond the point of attachment to standards $a\ a$, and their ends connected at $e$, substantially as described, and for the purpose set forth.

ASHBEL A. STIMSON.

Witnesses:
T. J. DEAVITT,
R. R. RIKER.